(12) United States Patent
Cui et al.

(10) Patent No.: US 11,042,419 B2
(45) Date of Patent: Jun. 22, 2021

(54) COOPERATIVE SCHEDULING METHOD AND SYSTEM FOR COMPUTING RESOURCE AND NETWORK RESOURCE OF CONTAINER CLOUD PLATFORM

(71) Applicant: Guangdong University of Petrochemical Technology, Maoming (CN)

(72) Inventors: Delong Cui, Maoming (CN); Zhiping Peng, Maoming (CN); Qirui Li, Maoming (CN); Jieguang He, Maoming (CN); Lizi Zheng, Maoming (CN)

(73) Assignee: Guangdong University of Petrochemical Technology, Maoming (CN)

( * ) Notice: Subject to any disclaimer, the term of this patent is extended or adjusted under 35 U.S.C. 154(b) by 0 days.

(21) Appl. No.: 16/683,843

(22) Filed: Nov. 14, 2019

(65) Prior Publication Data

US 2021/0004267 A1    Jan. 7, 2021

(30) Foreign Application Priority Data

Jul. 4, 2019   (CN) .......................... 201910598036.7

(51) Int. Cl.
| | |
|---|---|
| *G06F 9/50* | (2006.01) |
| *G06F 9/455* | (2018.01) |
| *G06F 9/48* | (2006.01) |
| *G06F 17/11* | (2006.01) |

(52) U.S. Cl.
CPC ........ *G06F 9/5083* (2013.01); *G06F 9/45558* (2013.01); *G06F 9/4881* (2013.01); *G06F 9/505* (2013.01); *G06F 17/11* (2013.01); *G06F 2009/4557* (2013.01); *G06F 2009/45595* (2013.01)

(58) Field of Classification Search
CPC .... G06F 9/505; G06F 9/45558; G06F 9/4881; G06F 9/5083; G06F 17/11; G06F 2009/4557; G06F 2009/45595
See application file for complete search history.

(56) References Cited

U.S. PATENT DOCUMENTS

| | | | |
|---|---|---|---|
| 9,886,300 B2 * | 2/2018 | Nakatsu | G06F 9/45558 |
| 2017/0199770 A1 * | 7/2017 | Peteva | G06F 9/5088 |

* cited by examiner

*Primary Examiner* — Jacob D Dascomb
(74) *Attorney, Agent, or Firm* — Troutman Pepper Hamilton Sanders LLP; Christopher C. Close, Jr.

(57) ABSTRACT

The present invention discloses a cooperative scheduling method and system for a computing resource and a network resource of a container cloud platform. The method includes: obtaining a load value of a container in a physical machine of a data center; calculating a load margin of a current container; if the load margin of the current container is less than 0, generating a first container sequence; if the load margin of the current container is greater than 0, obtaining a load value of a next container managed by a current physical machine, calculating a load margin of the next container, and updating the calculated load margin of the next container to the load margin of the current container. According to the method and the system of the present invention, resource utilization can be effectively improved.

3 Claims, 3 Drawing Sheets

COOPERATIVE SCHEDULING METHOD AND SYSTEM FOR COMPUTING RESOURCE AND NETWORK RESOURCE OF CONTAINER CLOUD PLATFORM

TECHNICAL FIELD

The present invention relates to the field of virtualized container technologies, and in particular, to a cooperative scheduling method and system for a computing resource and a network resource of a container cloud platform.

BACKGROUND

With the development of new virtualized container (Docker) technologies, a container virtualization technology and a cloud platform constructed by using the container virtualization technology are gradually being widely adopted by major cloud service providers due to their inherent advantages (such as application microservitization, standardization of operation and maintenance, automation of integration/deployment, low test and development costs, and the like).

Although a cloud computing virtual architecture with a container as a base running unit provides a new opportunity to resolve cost and efficiency problems in conventional virtual machine resource management, it also poses new challenges to the container cloud platform resource management. It is still very difficult to implement adaptive scheduling of a computing resource and network resource in a rapidly changing multi-tenant multi-data center cloud environment, even if a new container virtualization technology is used. For example, Amazon has at least 11 data centers covering four continents, and each data center has hundreds of thousands of servers. Google has at least 13 data centers covering four continents, and each data center has even more than one million servers. After various physical resources in a data center are virtualized, a number of resources are even larger, leading to high technology management difficulty and high complexity. Data centers are connected through a private network and high costs are required. In addition, there is a complex non-linear uncertainty relationship between a computing resource and a network resource. Separately adjusting a computing resource or a network resource can not necessarily improve resource utilization and application service performance, and therefore, dynamic coordination and configuration are required. Therefore, how to implement cooperative scheduling of a computing resource and a network resource is a new challenge for researchers.

SUMMARY

An objective of the present invention is to provide a cooperative scheduling method and system for a computing resource and a network resource of a container cloud platform, which have an advantage of capable of improving resource utilization.

To achieve the above purpose, the present invention provides the following technical solutions.

A cooperative scheduling method for a computing resource and a network resource of a container cloud platform includes:

obtaining a load value of a container in a physical machine of a data center, wherein each data center manages multiple physical machines, and each physical machine manages multiple containers;

calculating a load margin of a current container, wherein the load margin of the container is a difference between a rated load value of the container and a current load value of the container;

determining whether the load margin of the current container is less than 0;

if the load margin of the current container is less than 0, calculating and comparing load margins of other containers managed by a physical machine in which the current container is located, and sorting, in descending order, the load margins of the other containers managed by the physical machine in which the current container is located, to generate a first container sequence; and determining whether a maximum load margin in the first container sequence is less than the load margin of the current container, and if the maximum load margin is greater than or equal to the load margin of the current container, migrating load of the current container to a container corresponding to a load margin that is greater than 0 and that is in the first container sequence; or if the maximum load margin is less than the load margin of the current container, adding a physical machine to a data management center in which the current container is located, and migrating load of the current container to a container managed by the added physical machine, or migrating load of the current container to a container managed by another physical machine in a data center in which the current container is located; or if the load margin of the current container is greater than 0, determining whether to traverse all containers managed by a current physical machine;

if all the containers managed by the current physical machine are traversed, ending a scheduling task; or if not all the containers managed by the current physical machine have been traversed, obtaining a load value of a next container managed by the current physical machine, calculating a load margin of the next container, updating the calculated load margin of the next container to the load margin of the current container, and returning to the step of "determining whether the load margin of the current container is less than 0".

Optionally, the migrating load of the current container to a container corresponding to a load margin that is greater than 0 and that is in the first container sequence specifically includes:

calculating first migration costs for migrating the current container to all containers corresponding to load margins that are greater than 0 and that are in the first container sequence; and comparing the first migration costs, and migrating the current container to a container corresponding to a lowest first migration cost.

Optionally, the migrating load of the current container to a container managed by the added physical machine, or migrating load of the current container to a container managed by another physical machine in a data center in which the current container is located specifically includes:

calculating a sum of load margins of all containers managed by each physical machine to obtain a total load margin of each physical machine;

comparing and selecting a physical machine corresponding to a maximum total load margin; and migrating the load of the current container to a container managed by the physical machine corresponding to the maximum total load margin.

Optionally, the migrating the load of the current container to a container managed by the physical machine corresponding to the maximum total load margin specifically includes:

calculating a load margin of each container managed by the physical machine corresponding to the maximum total load margin;

sorting, in descending order, the load margins of the containers managed by the physical machine corresponding to the maximum total load margin, to generate a second container sequence;

calculating second migration costs for migrating the current container to all containers corresponding to load margins that are greater than 0 and that are in the second container sequence; and comparing the second migration costs, and migrating the current container to a container corresponding to a lowest second migration cost.

Optionally, a method for calculating the first migration costs or the second migration costs specifically includes:

obtaining an activity degree of the physical machine receiving load migration of the current container, a to-be-migrated load value of the current container, and a switching frequency of the container to which the load of the current container is migrated; and calculating the first migration costs or the second migration costs f(C) according to the following formula:

$$f(C)=\alpha C_1+\beta C_2+\gamma C_3$$

wherein in the formula, C represents the current container, f(C) represents the first migration costs or the second migration costs, $C_1$ represents the activity degree of the physical machine receiving load migration of the current container, $C_2$ represents the to-be-migrated load value of the current container, $C_3$ represents the switching frequency of the container to which the load of the current container is migrated, α represents a first weight factor, β represents a second weight factor, γ represents a third weight factor, and α+β+γ=1.

A cooperative scheduling system for a computing resource and a network resource of a container cloud platform includes:

a module for obtaining a load value of a container in a physical machine of a data center, configured to obtain a load value of a container in a physical machine of a data center, wherein each data center manages multiple physical machines, and each physical machine manages multiple containers;

a current-container load margin calculation module, configured to calculate a load margin of a current container, wherein the load margin of the container is a difference between a rated load value of the container and a current load value of the container;

a first determining module, configured to determine whether the load margin of the current container is less than 0;

a first-container-sequence generation module, configured to: if the load margin of the current container is less than 0, calculate and compare load margins of other containers managed by a physical machine in which the current container is located, and sort, in descending order, the load margins of the other containers managed by the physical machine in which the current container is located, to generate a first container sequence;

a second determining module, configured to determine whether a maximum load margin in the first container sequence is less than the load margin of the current container;

a first migration module, configured to: if the maximum load margin is greater than or equal to the load margin of the current container, migrate load of the current container to a container corresponding to a load margin that is greater than 0 and that is in the first container sequence;

a second migration module, configured to: if the maximum load margin is less than the load margin of the current container, add a physical machine to a data management center in which the current container is located, and migrate load of the current container to a container managed by the added physical machine, or migrate load of the current container to a container managed by another physical machine in a data center in which the current container is located;

a third determining module, configured to: when the load margin of the current container is greater than 0, determine whether to traverse all containers managed by a current physical machine;

an end module, configured to: when all the containers managed by the current physical machine are traversed, end a scheduling task; and a container load margin update module, configured to: if not all the containers managed by the current physical machine have been traversed, obtain a load value of a next container managed by the current physical machine, calculate a load margin of the next container, update the calculated load margin of the next container to the load margin of the current container, and send an instruction to the first determining module.

Optionally, the first migration module specifically includes:

a first-migration-cost calculation unit, configured to calculate first migration costs for migrating the current container to all containers corresponding to load margins that are greater than 0 and that are in the first container sequence;

a first comparison unit, configured to compare the first migration costs; and a first migration unit, configured to migrate the current container to a container corresponding to a lowest first migration cost.

Optionally, the second migration module specifically includes:

a total load margin calculation unit, configured to calculate a sum of load margins of all containers managed by each physical machine to obtain a total load margin of each physical machine;

a second comparison unit, configured to compare and select a physical machine corresponding to a maximum total load margin; and a second migration unit, configured to migrate the load of the current container to a container managed by the physical machine corresponding to the maximum total load margin.

Optionally, the second migration unit specifically includes:

a load margin calculation subunit, configured to calculate a load margin of each container managed by the physical machine corresponding to the maximum total load margin;

a second-container-sequence generation subunit, configured to sort, in descending order, the load margins of the containers managed by the physical machine corresponding to the maximum total load margin, to generate a second container sequence;

a second-migration-cost calculation subunit, configured to calculate second migration costs for migrating the current container to all containers corresponding to load margins that are greater than 0 and that are in the second container sequence;

a second comparison subunit, configured to compare the second migration costs; and a second migration subunit, configured to migrate the current container to a container corresponding to a lowest second migration cost.

Compared with the prior art, beneficial effects of the present invention lie in:

The present invention provides a cooperative scheduling method and system for a computing resource and a network resource of a container cloud platform. The method includes: obtaining a load value of a container in a physical machine of a data center; calculating a load margin of a current container; determining whether the load margin of the current container is less than 0; if the load margin of the current container is less than 0, calculating and comparing load margins of other containers managed by a physical machine in which the current container is located, and sorting, in descending order, the load margins of the other containers managed by the physical machine in which the current container is located, to generate a first container sequence; and determining whether a maximum load margin is greater than the load margin of the current container, and if the maximum load margin is greater than or equal to the load margin of the current container, migrating load of the current container to a container corresponding to a load margin that is greater than 0 and that is in the first container sequence; or if the maximum load margin is less than the load margin of the current container, adding a physical machine to a data management center in which the current container is located, and migrating load of the current container to a container managed by the added physical machine, or migrating load of the current container to a container managed by another physical machine in a data center in which the current container is located; if the load margin of the current container is greater than 0, obtaining a load value of a next container managed by a current physical machine, calculating a load margin of the next container, and updating the calculated load margin of the next container to the load margin of the current container. According to the method and the system of the present invention, resource utilization can be effectively improved.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a cooperative scheduling method and system for a computing resource and a network resource of a container cloud platform, which have an advantage of improving resource utilization.

To make the foregoing objective, features, and advantages of the present invention clearer and more comprehensible, the present invention is further described in detail below with reference to the accompanying drawings and specific embodiments.

Embodiment 1

Figure 1:
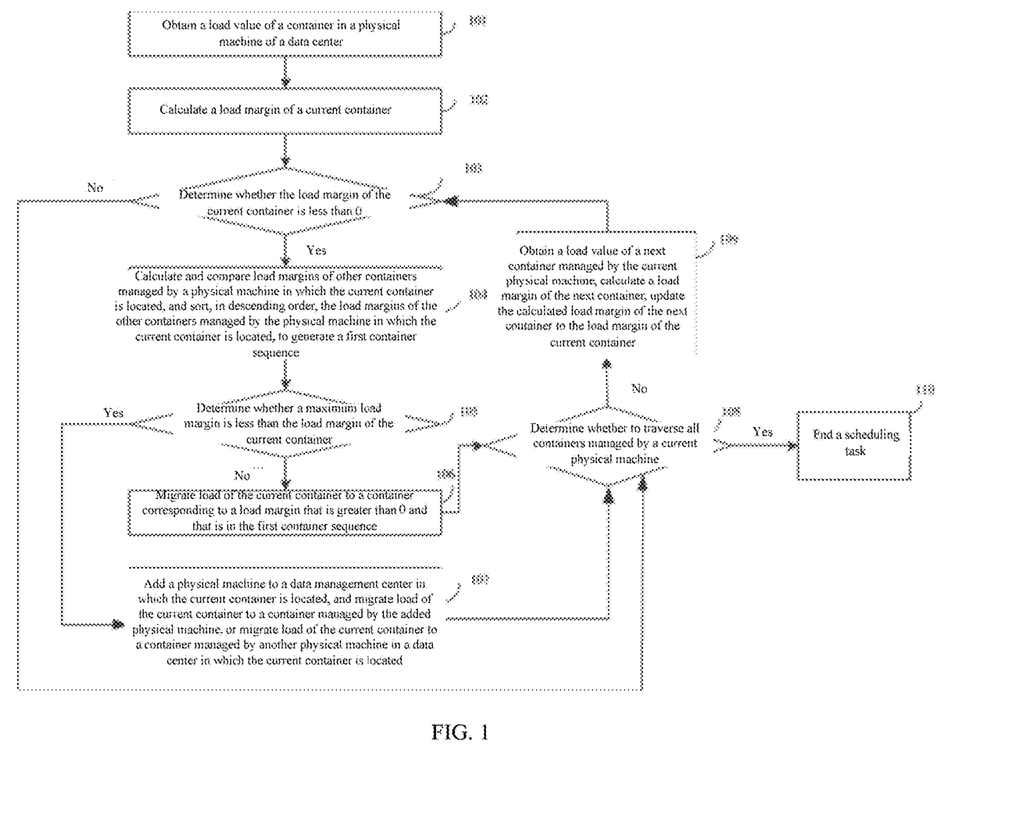
FIG. 1 is a flowchart of a cooperative scheduling method for a computing resource and a network resource of a container cloud platform according to an embodiment of the present invention.

FIG. 1 is a flowchart of a cooperative scheduling method for a computing resource and a network resource of a container cloud platform according to an embodiment of the present invention. As shown in FIG. 1, the cooperative scheduling method for a computing resource and a network resource of a container cloud platform includes the following steps:

Step 101: Obtain a load value of a container in a physical machine of a data center, where each data center manages multiple physical machines, and each physical machine manages multiple containers.

Step 102: Calculate a load margin of a current container, where the load margin of the container is a difference between a rated load value of the container and a current load value of the container.

Step 103: Determine whether the load margin of the current container is less than 0; and if the load margin of the current container is less than 0, conduct step 104, or if the load margin of the current container is greater than 0, conduct step 108.

Step 104: Calculate and compare load margins of other containers managed by a physical machine in which the current container is located, and sort, in descending order, the load margins of the other containers managed by the physical machine in which the current container is located, to generate a first container sequence.

Step 105: Determine whether a maximum load margin in the first container sequence is less than the load margin of the current container; and if the maximum load margin is greater than or equal to the load margin of the current container, conduct step 106, or if the maximum load margin is less than the load margin of the current container, conduct step 107.

Step 106: Migrate load of the current container to a container corresponding to load margin that is greater than 0 and that is in the first container sequence, and then conduct step 108.

The step 106 specifically includes:

calculating first migration costs for migrating the current container to all containers corresponding to load margins that are greater than 0 and that are in the first container sequence, where a method for calculating the first migration costs specifically includes:

obtaining an activity degree of the physical machine to which the load of the current container is to be migrated, a to-be-migrated load value of the current container, and a switching frequency of the container to which the load of the current container is to be migrated; and calculating the first migration costs $f_1(C)$ according to the following formula:

$$f_1(C)=\alpha C_1+\beta C_2+\gamma C_3$$

where in the formula, C represents the current container, $f_1(C)$ represents the first migration costs, $C_1$ represents the activity degree of the physical machine receiving load migration of the current container, $C_2$ represents the to-be-migrated load value of the current container, $C_3$ represents the switching frequency of the container to which the load of the current container is migrated, $\alpha$ represents a first weight factor, $\beta$ represents a second weight factor, $\gamma$ represents a third weight factor, and $\alpha+\beta+\gamma=1$; and comparing the first migration costs, and migrating the current container to a container corresponding to a lowest first migration cost.

Step 107: Add a physical machine to a data management center in which the current container is located, and migrate load of the current container to a container managed by the added physical machine, or migrate load of the current container to a container managed by another physical machine in a data center in which the current container is located; and then conduct step 108.

The step 107 specifically includes:

calculating a sum of load margins of all containers managed by each physical machine to obtain a total load margin of each physical machine;

comparing and selecting a physical machine corresponding to a maximum total load margin; and migrating the load of the current container to a container managed by the physical machine corresponding to the maximum total load margin, where a specific process includes:

calculating a load margin of each container managed by the physical machine corresponding to the maximum total load margin;

sorting, in descending order, the load margins of the containers managed by the physical machine corresponding to the maximum total load margin, to generate a second container sequence;

calculating second migration costs for migrating the current container to all containers corresponding to load margins that are greater than 0 and that are in the second container sequence, where a method for calculating the second migration costs specifically includes:

obtaining an activity degree of the physical machine to which the load of the current container is to be migrated, a to-be-migrated load value of the current container, and a switching frequency of the container to which the load of the current container is to be migrated; and calculating the second migration costs $f_2(C)$ according to the following formula:

$$f_2(C)=\alpha C_1+\beta C_2+\gamma C_3$$

where in the formula, C represents the current container, $f_2(C)$ represents the second migration costs, $C_1$ represents the activity degree of the physical machine receiving load migration of the current container, $C_2$ represents the to-be-migrated load value of the current container, $C_3$ represents the switching frequency of the container to which the load of the current container is migrated, $\alpha$ represents a first weight factor, $\beta$ represents a second weight factor, $\gamma$ represents a third weight factor, and $\alpha+\beta+\gamma=1$; and comparing the second migration costs, and migrating the current container to a container corresponding to a lowest second migration cost.

Step 108: Determine whether to traverse all containers managed by a current physical machine, and if yes, conduct step 110; or if no, conduct step 109.

Step 109: Obtain a load value of a next container managed by the current physical machine, calculate a load margin of the next container, update the calculated load margin of the next container to the load margin of the current container, and return to step 103.

Step 110: End a scheduling task.

Figure 2:
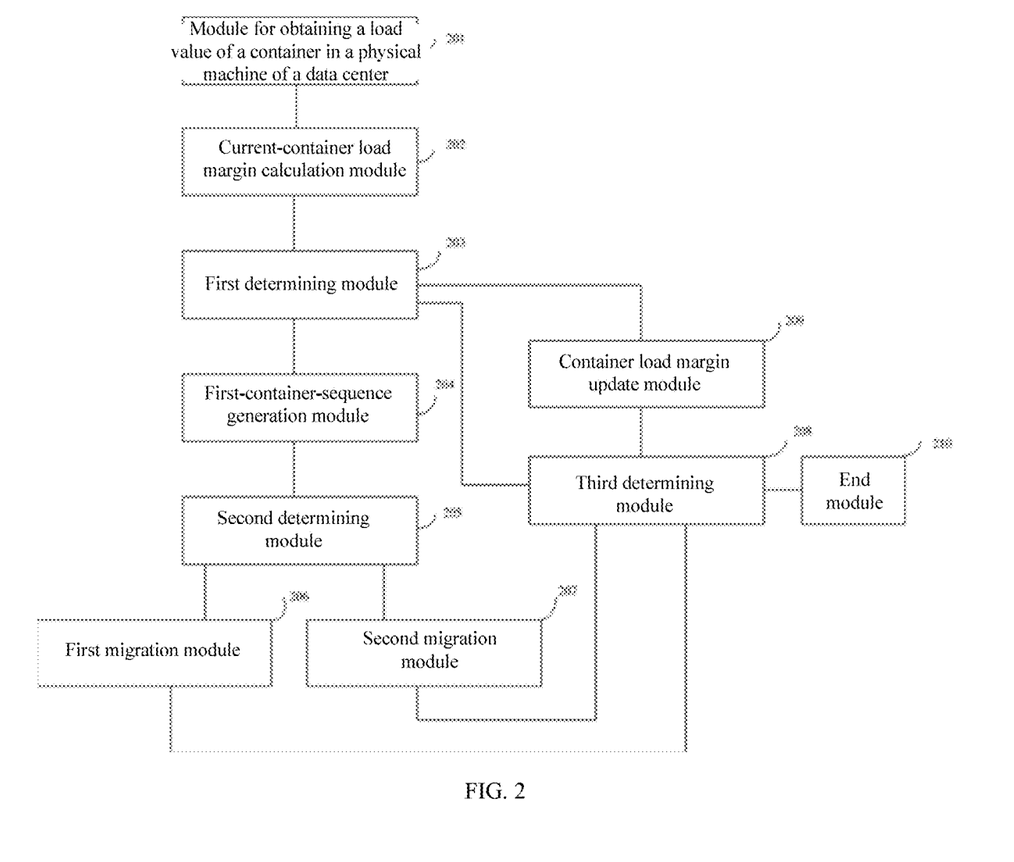
FIG. 2 is a structural diagram of a cooperative scheduling system for a computing resource and a network resource of a container cloud platform according to an embodiment of the present invention.

FIG. 2 is a structural diagram of a cooperative scheduling system for a computing resource and a network resource of a container cloud platform according to an embodiment of the present invention. As shown in FIG. 2, the cooperative scheduling system for a computing resource and a network resource of a container cloud platform includes a module 201 for obtaining a load value of a container in a physical machine of a data center, a current-container load margin calculation module 202, a first determining module 203, a first-container-sequence generation module 204, a second determining module 205, a first migration module 206, a second migration module 207, a third determining module 208, a container load margin update module 209, and an end module 210.

The module 201 for obtaining a load value of a container in a physical machine of a data center is configured to obtain a load value of a container in a physical machine of a data center, where each data center manages multiple physical machines, and each physical machine manages multiple containers.

The current-container load margin calculation module 202 is configured to calculate a load margin of a current container, where the load margin of the container is a difference between a rated load value of the container and a current load value of the container.

The first determining module 203 is configured to determine whether the load margin of the current container is less than 0.

The first-container-sequence generation module 204 is configured to: if the load margin of the current container is less than 0, calculate and compare load margins of other containers managed by a physical machine in which the current container is located, and sort, in descending order, the load margins of the other containers managed by the physical machine in which the current container is located, to generate a first container sequence.

The second determining module 205 is configured to determine whether a maximum load margin in the first container sequence is less than the load margin of the current container.

The first migration module 206 is configured to: if the maximum load margin is greater than or equal to the load margin of the current container, migrate load of the current container to a container corresponding to a load margin that is greater than 0 and that is in the first container sequence.

The first migration module 206 specifically includes:

a first-migration-cost calculation unit, configured to calculate first migration costs for migrating the current container to all containers corresponding to load margins that are greater than 0 and that are in the first container sequence; and calculate the first migration costs f1(C) according to the following formula:

$$f_1(C) = \alpha C_1 + \beta C_2 + \gamma C_3$$

where in the formula, C represents the current container, f1(C) represents the first migration costs, C1 represents the activity degree of the physical machine receiving load migration of the current container, C2 represents the to-be-migrated load value of the current container, C3 represents the switching frequency of the container to which the load of the current container is migrated, $\alpha$ represents a first weight factor, $\beta$ represents a second weight factor, $\gamma$ represents a third weight factor, and $\alpha+\beta+\gamma=1$.

a first comparison unit, configured to compare the first migration costs; and a first migration unit, configured to migrate the current container to a container corresponding to a lowest first migration cost.

The second migration module 207 is configured to: if the maximum load margin is less than the load margin of the current container, add a physical machine to a data management center in which the current container is located, and migrate load of the current container to a container managed by the added physical machine, or migrate load of the current container to a container managed by another physical machine in a data center in which the current container is located.

The second migration module 207 specifically includes:

a total load margin calculation unit, configured to calculate a sum of load margins of all containers managed by each physical machine to obtain a total load margin of each physical machine;

a second comparison unit, configured to compare and select a physical machine corresponding to a maximum total load margin; and a second migration unit, configured to migrate the load of the current container to a container managed by the physical machine corresponding to the maximum total load margin.

The second migration unit specifically includes:

a load margin calculation subunit, configured to calculate a load margin of each container managed by the physical machine corresponding to the maximum total load margin;

a second-container-sequence generation subunit, configured to sort, in descending order, the load margins of the containers managed by the physical machine corresponding to the maximum total load margin, to generate a second container sequence;

a second-migration-cost calculation subunit, configured to calculate second migration costs for migrating the current container to all containers corresponding to load margins that are greater than 0 and that are in the second container sequence; and calculate the second migration costs f2(C) according to the following formula:

$$f_2(C) = \alpha C_1 + \beta C_2 + \gamma C_3$$

where in the formula, C represents the current container, f2(C) represents the second migration costs, C1 represents the activity degree of the physical machine receiving load migration of the current container, C2 represents the to-be-migrated load value of the current container, C3 represents the switching frequency of the container to which the load of the current container is migrated, $\alpha$ represents a first weight factor, $\beta$ represents a second weight factor, $\gamma$ represents a third weight factor, and $\alpha+\beta+\gamma=1$;

a second comparison subunit, configured to compare the second migration costs; and a second migration subunit, configured to migrate the current container to a container corresponding to a lowest second migration cost.

The third determining module 208 is configured to: when the load margin of the current container is greater than 0, determine whether to traverse all containers managed by a current physical machine.

The container load margin update module 209 is configured to: if not all the containers managed by the current physical machine have been traversed, obtain a load value of a next container managed by the current physical machine, calculate a load margin of the next container, update the calculated load margin of the next container to the load margin of the current container, and send an instruction to the first determining module 203.

The end module 210 is configured to: when all the containers managed by the current physical machine are traversed, end a scheduling task.

Figure 3:
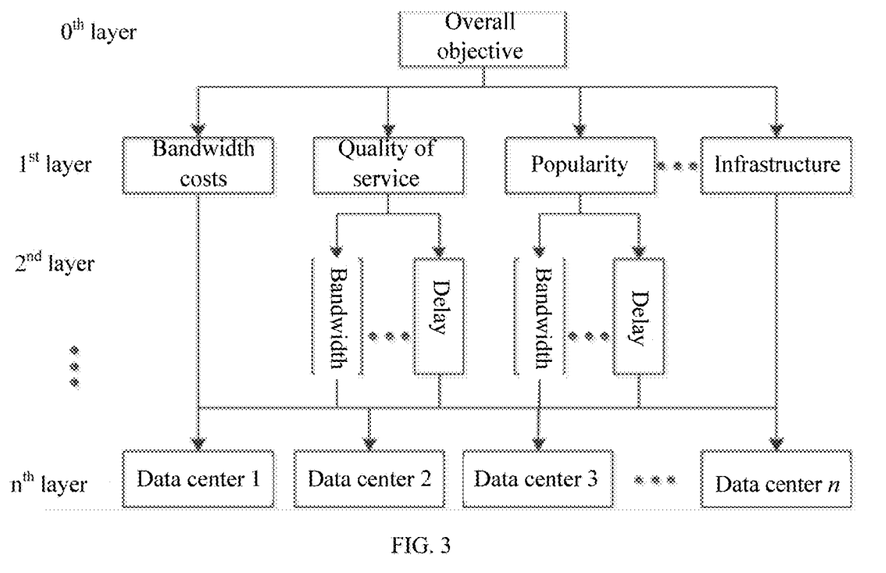
FIG. 3 is a hierarchical structure diagram of resource scheduling between data centers based on multi-attribute information according to an embodiment of the present invention.

A hierarchical structure of resource scheduling between data centers of multi-attribute information is constructed. The hierarchical structure of resource scheduling between data centers that is constructed in the present invention is shown in FIG. 3. FIG. 3 is a hierarchical structure diagram of resource scheduling between data centers based on multi-attribute information. Detailed description is as follows:

A 0th layer provides a final evaluation value for comprehensive consideration of multi-attribute information.

A 1st layer provides several core attributes that a data center manager is most concerned about, for example, a price of access bandwidth of a transit data center, quality of service of an access link, and data energy efficiency.

A 2nd layer provides decomposition of core attributes at the 1st layer, for example, the quality of service of a link is mainly related to a delay and bandwidth, while popularity of content is related to a geographic position of a user and a scale of local users.

In the same way, a 3rd layer, a 4th layer, and an nth layer can be further constructed.

In the constructed hierarchical structure, a cloud network with a tenant as a granularity may be modeled to a two-layer hierarchical coordination model; a cloud broker indirectly conducts centralized global control on the whole system through coordination of resource requirements of tenants, so as to implement a large-system hierarchical control manner combining "centralization and decentralization", and the model is as follows:

At a cloud broker layer, $$\max(\min_{x \in X}) F(x, v(x))$$

$$s.t. \ X = \{x \in R^n \mid h(x) \le 0\},$$

where $v(x) = (v_1(x), v_2(x), \ldots, v_N(x))$.

At a tenant layer, $$v_i(x) = \max(\min_{y^i \in Y_i(x)}) f_i(x, y^i)$$

$$s.t. \ Y_i(x) = \{y^i \in R^n \mid g^i(x, y^i) \le 0\}.$$

In the formula, F is an objective function of the cloud broker layer, and is usually lowest total costs or a maximum total revenue; X is a constraint function of the cloud broker layer, and includes a resource selection and scheduling constraint, a total global resource amount and available quantity constraint, a tenant grouping constraint, and the like; v(x) is a reaction decision vector of a tenant after x is determined; $v_i(x)$ is a scheduling target of a tenant i, and is usually lowest payment costs or a maximum total revenue of the tenant; and $Y_i(x)$ is a scheduling constraint of the tenant i, and includes a temporal constraint on using a resource, a global and local use constraint of an allocated resource, and the like.

Based on the above objective, a Double Q-network algorithm is used to implement a cooperative scheduling mechanism of a computing resource and a network resource in a cloud data center of a multi-tenant container. Related concepts are defined as follows:

State space: A quintuple S=(RA,WR,AW,PJ,IM) is used to represent the state space, where RA represents a resource available time. WR represents workload of a to-be-scheduled task; AW represents total workload in a waiting queue; PJ represents a task submission proportion of each tenant in the queue; IM represents a number of free container resources.

Motion space: A triplet J=(WS,TJ,ET) is used to represent the motion space, where WS represents a tenant identifier; TJ represents a task type; and ET represents a task execution time.

Reward function: Objective functions of the cloud broker layer and the tenant layer in the hierarchical coordination model are used as a reward function. Knowledge construction and learning are conducted on information fed back by each agent, and finally an optimal policy for implementing the objective functions is obtained.

Figure 4:
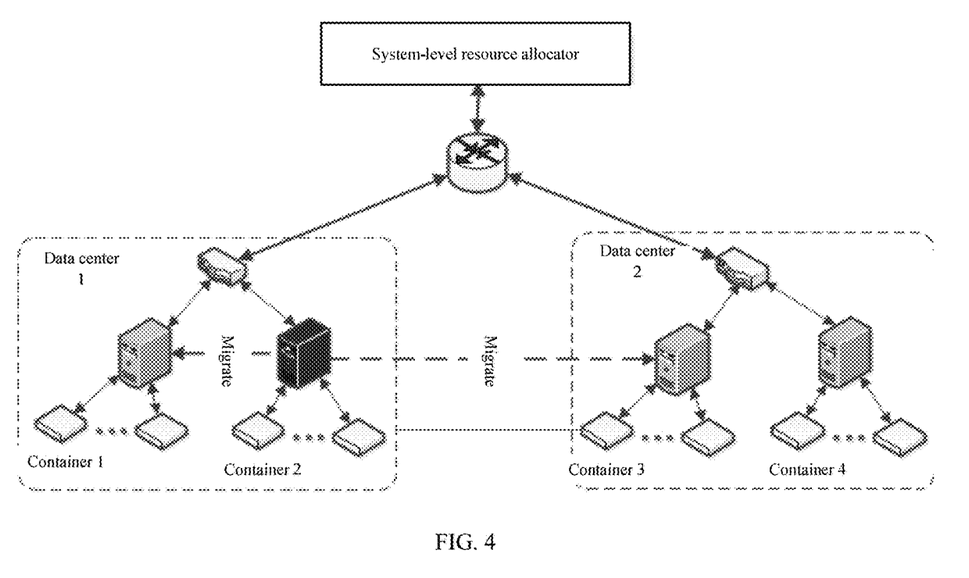
FIG. 4 is a model diagram of a computing resource management system of a server according to an embodiment of the present invention.

FIG. 4 is a model diagram of a computing resource management system of a server. As shown in FIG. 4, when a monitor in a data center finds that load of a server increases and performance is insufficient, the data center calls a dynamic scheduler program. The scheduling process includes the following two cases:

In a first case, first, a physical machine is added and (or) a corresponding container is migrated within the data center to avoid migration between data centers.

In a second case, if adjustment of the data center itself fails to meet a performance requirement of a user, the data center initiates a request to a cloud computing system to conduct container migration between the data centers.

Assuming that load of a container $C^i$ on a physical host $H^i$ increases, performance insufficiency is caused. First, $H^i$ is observed to determine whether sufficient available resources are provided for $C^i$. If there are sufficient resources, these resources are allocated to $C^i$. If no enough resources are provided for $C^i$ on $H^i$, container migration inside the data center is first considered. Migration may be divide into two types: direct migration and indirect migration. Direct migration is to migrate $C^i$ to another physical host with sufficient resources. Indirect migration is to migrate a container in $H^i$ other than $C^i$, to free up enough resources for $C^i$ on $H^i$. A migration manner is selected based on a principle of minimum migration costs, and factors considered include activity (a CPU resource) of a migrated virtual machine, a migrated data volume (a memory resource), a switching frequency (an I/O resource), and the like. Assuming a to-be-migrated container is C', C' is a minimum value in a case in which the following functions satisfy conditions: $C'_{CPU} > C^i_{CPU}$, $C'_{MEM} > C^i_{MEM}$, and $C'_{IO} > C^i_{IO}$.

$$f(C') = \alpha C'_{CPU} + \beta C'_{MEM} + \gamma C'_{IO}$$

$\alpha$, $\beta$, and $\gamma$ represent weight factors, and are used to set weighting degrees of these three types of resources.

The data center sends a report to a system resource allocator when adjustment inside the data center is invalid or a user requirement is still not met after adjustment is conducted. Content of the report is a set of containers that need to be migrated out of this data center and transferred to another data center.

It needs to try to not destroy a restricted relationship between containers during migration. If the restricted relationship between containers is destroyed, and containers with a restricted relationship are distributed in different data centers, data exchange between these containers becomes difficult. Therefore, a container cluster is used as a resource migration unit between data centers. A migrated container cluster is also selected based on the principle of minimal migration costs, which means that it is possible to migrate an overloaded container cluster, or migrate another container cluster to free up resources for an overloaded container cluster.

After receiving a request, the system resource allocator reinitiates an auction process to migrate a container from an original data center to another data center. This process is similar to an auction process in the foregoing data center selection algorithm, but is relatively simple. A to-be-auctioned container cluster should be bided as a whole between other data centers except the original data center, and there is no combination bidding. Therefore, a sequential auction method is used to conduct sorting according to a bidding status of each data center, and the resource distributor only needs to select a highest bidder.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A cooperative scheduling method for a computing resource and a network resource of a container cloud platform, comprising:
   obtaining a load value of a container in a physical machine of a data center, wherein the data center manages multiple physical machines, and each physical machine manages multiple containers;
   calculating a load margin of a current container, wherein the load margin of the current container is a difference between a rated load value of the current container and a current load value of the current container;
   determining whether the load margin of the current container is less than 0;
   if the load margin of the current container is less than 0, calculating and comparing load margins of other containers managed by a physical machine in which the current container is located, and sorting, in descending order, the load margins of the other containers managed by the physical machine in which the current container is located, to generate a first container sequence; and
   determining whether a maximum load margin in the first container sequence is less than the load margin of the current container, and if the maximum load margin is greater than or equal to the load margin of the current container, migrating load of the current container to a container corresponding to a load margin that is greater than 0 and that is in the first container sequence;

specifically: calculating first migration costs for migrating the current container to all containers corresponding to load margins that are greater than 0 and that are in the first container sequence;

and comparing the first migration costs, and migrating the current container to a container corresponding to a lowest first migration cost;

if the maximum load margin is less than the load margin of the current container, adding a physical machine to a data management center in which the current container is located and migrating load of the current container to a container managed by the added physical machine, or migrating load of the current container to a container managed by another physical machine in a data center in which the current container is located; specifically: calculating a sum of load margins of all containers managed by each physical machine to obtain a total load margin of each physical machine; comparing and selecting a physical machine corresponding to a maximum total load margin; and migrating the load of the current container to a container managed by the physical machine corresponding to the maximum total load margin;

wherein the migrating the load of the current container to a container managed by the physical machine corresponding to the maximum total load margin specifically comprises:

calculating a load margin of each container managed by the physical machine corresponding to the maximum total load margin;

sorting, in descending order, the load margins of the containers managed by the physical machine corresponding to the maximum total load margin, to generate a second container sequence;

calculating second migration costs for migrating the current container to all containers corresponding to load margins that are greater than 0 and that are in the second container sequence; and comparing the second migration costs, and migrating the current container to a container corresponding to a lowest second migration cost;

if the load margin of the current container is greater than 0, determining whether to traverse all containers managed by a current physical machine;

if all the containers managed by the current physical machine are traversed, ending a scheduling task; or if not all the containers managed by the current physical machine have been traversed, obtaining a load value of a next container managed by the current physical machine, calculating a load margin of the next container, updating the calculated load margin of the next container to the load margin of the current container, and returning to the step of "determining whether the load margin of the current container is less than 0".

2. The cooperative scheduling method for a computing resource and a network resource of a container cloud platform according to claim 1, wherein a method for calculating the first migration costs or the second migration costs specifically comprises:

obtaining an activity degree of the physical machine receiving load migration of the current container, a to-be-migrated load value of the current container, and a switching frequency of the container to which the load of the current container is migrated; and calculating the first migration costs or the second migration costs f(C) according to the following formula:

$$f(C)=\alpha C_1+\beta C_2+\gamma C_3$$

wherein in the formula, C represents the current container, f(C) represents the first migration costs or the second migration costs, $C_1$ represents the activity degree of the physical machine receiving load migration of the current container, $C_2$ represents the to-be-migrated load value of the current container, $C_3$ represents the switching frequency of the container to which the load of the current container is migrated, $\alpha$ represents a first weight factor, $\beta$ represents a second weight factor, $\gamma$ represents a third weight factor, and $\alpha+\beta+\gamma=1$.

3. A cooperative scheduling system for a computing resource and a network resource of a container cloud platform, comprising a computer, wherein the computer is configured to:

obtain a load value of a container in a physical machine of a data center, wherein the data center manages multiple physical machines, and each physical machine manages multiple containers;

calculate a load margin of a current container, wherein the load margin of the current container is a difference between a rated load value of the current container and a current load value of the current container;

determine whether the load margin of the current container is less than 0;

if the load margin of the current container is less than 0, calculate and compare load margins of other containers managed by a physical machine in which the current container is located, and sort, in descending order, the load margins of the other containers managed by the physical machine in which the current container is located, to generate a first container sequence;

determine whether a maximum load margin in the first container sequence is less than the load margin of the current container;

if the maximum load margin is greater than or equal to the load margin of the current container, migrate load of the current container to a container corresponding to a load margin that is greater than 0 and that is in the first container sequence; wherein to migrate the load of the current container to a container corresponding to the load margin that is greater than 0 and that is in the first container sequence, the computer is further configured to:

calculate first migration costs for migrating the current container to all containers corresponding to load margins that are greater than 0 and that are in the first container sequence;

compare the first migration costs; and migrate the current container to a container corresponding to a lowest first migration cost;

if the maximum load margin is less than the load margin of the current container, add a physical machine to a data management center in which the current container is located and migrate load of the current container to a container managed by the added physical machine, or migrate load of the current container to a container managed by another physical machine in a data center in which the current container is located; wherein the computer is further configured to:

calculate a sum of load margins of all containers managed by each physical machine to obtain a total load margin of each physical machine;

compare and select a physical machine corresponding to a maximum total load margin; and migrate the load of the current container to a container managed by the physical machine corresponding to the maximum total load margin;

wherein to migrate the load of the current container to the container managed by the physical machine corresponding to the maximum total load margin, the computer is further configured to:
calculate a load margin of each container managed by the physical machine corresponding to the maximum total load margin;
sort, in descending order, the load margins of the containers managed by the physical machine corresponding to the maximum total load margin, to generate a second container sequence;
calculate second migration costs for migrating the current container to all containers corresponding to load margins that are greater than 0 and that are in the second container sequence;
compare the second migration costs; and
migrate the current container to a container corresponding to a lowest second migration cost;
when the load margin of the current container is greater than 0, determine whether to traverse all containers managed by a current physical machine;
when all the containers managed by the current physical machine are traversed, end a scheduling task; and
if not all the containers managed by the current physical machine have been traversed, obtain a load value of a next container managed by the current physical machine, calculate a load margin of the next container, update the calculated load margin of the next container to the load margin of the current container.

* * * * *